United States Patent [19]
Fletcher et al.

[11] 3,790,409
[45] Feb. 5, 1974

[54] STORAGE BATTERY COMPRISING NEGATIVE PLATES OF A WEDGE-SHAPED CONFIGURATION

[76] Inventors: James C. Fletcher, Administrator of the National Aeronautics and Space Administration with respect to an invention of; Richard S. Bogner, Altadena, Calif.; Charles D. Farris, Flemingsburg, Ky.

[22] Filed: Feb. 22, 1972

[21] Appl. No.: 228,163

[52] U.S. Cl. ..................................... 136/20, 136/30
[51] Int. Cl. .......................................... H01m 43/00
[58] Field of Search .................. 136/30–31, 6, 65, 136/20, 95, 102, 143, 146–147, 100, 111

[56] References Cited
UNITED STATES PATENTS

| | | | |
|---|---|---|---|
| 1,149,665 | 8/1915 | Mason | 136/111 |
| 1,149,666 | 8/1915 | Mason | 136/111 |
| 916,320 | 3/1909 | Joel | 136/14 |
| 608,216 | 8/1898 | Ogden | 136/102 |
| 1,332,483 | 3/1920 | Bridge | 136/155 |
| 2,727,083 | 12/1955 | Hollman et al. | 136/30 |
| 3,216,859 | 11/1965 | Duncan | 136/6 |
| 3,450,566 | 6/1969 | Solomon et al. | 136/6 |
| 3,493,434 | 2/1970 | Goodkin | 136/30 |
| 3,501,350 | 3/1970 | Horowitz | 136/20 |

*Primary Examiner*—Anthony Skapars
*Attorney, Agent, or Firm*—Monte F. Mott et al.

[57] ABSTRACT

An improved silver-zinc battery particularly suited for use in an environment wherein the battery operatively is subjected to multiple charge/discharge cycling over extended periods. The battery is characterized by a plurality of positive plates of a planar configuration having interposed therebetween a plurality of negative plates of a wedge-shaped configuration and a separator system including a highly absorbent material contiguous with the surfaces of the plates and multiple semi-permeable membranes interposed therebetween.

5 Claims, 5 Drawing Figures

STORAGE BATTERY COMPRISING NEGATIVE PLATES OF A WEDGE-SHAPED CONFIGURATION

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention relates generally to electric storage batteries and more particularly to an improved silver-zinc battery particularly having an increased cycle life.

2. Description of the Prior Art

It is, of course, well recognized by those familiar with the design of systems employed in storing electrical energy that silver-zinc storage batteries have certain characteristics which render these batteries particularly desirable over other storage batteries, particularly in instances where high energy density, high rate capability, and low capacity loss are of a primary concern.

It also is well recognized that in such batteries the porosity of the negative plates affects cell performance. For example, it is accepted that the relative capacity and the average ampere-hour efficiency of batteries provided with zinc plates rapidly increase as the porosity of the zinc electrode or plate is increased from 60 percent to 80 percent.

In practice, zinc plates often are fabricated by employing, as a negative composition, zinc-oxide and a mechanical binder such as Teflon and polyvinyl alcohol and the like. This composition is applied to a grid, formed of such material as silver, and sintered. In forming zinc plates present production methods frequently require that a mixture of zinc-oxide, binders and additives by dry-pressed onto a grid of silver placed in a mold conforming to desired dimensions. Where preferred, zinc can be deposited on a suitable grid, through electrical deposition, with the plates thereafter being rolled or pressed to a desired thickness. As a practical matter, electrical connections are made in any suitably manner, such as by welding or mechanically fastening a lead wire to the grid.

One of the notorious difficulties encountered in employing zinc plates employing either of the aforementioned techniques is that the contour of the zinc plates often undergoes a change caused by solution and re-precipitation of the zinc-oxide as the cells cycle between a charged and discharged condition. Particularly in gravitational fields, the contour tends to thicken toward the lower part of the electrode as cycling occurs causing the plate to be thickened with an attendant reduction in total available surface area. In an attempt to overcome this innate tendency, various binders have been suggested. However, in most instances cycle life has not been improved and in many instances a reverse effect has been achieved. For example, it was found that carboxymethylcellulose in concentration above 0.5 percent decreased cycle life by migrating toward the positive electrode where it reacted with silver-oxide to deposit reduced silver on the separator system. While 1.7 percent Teflon added to zinc-oxide powder was found to double the cell life a distinct disadvantage attends its use, since the Teflon additive reduced the oxygen recombination rate by about 35 percent on open circuit and by 15 percent on overcharge.

A storage battery of a type similar to that hereinbefore mentioned is more fully described in United States Letters Patent No. 2,727,083.

Hence, it should be recognized that there currently exists a need for a practical solution to the perplexing problem of overcoming the effects introduced through the so-called shape-change phenomenon which involves a redistribution of the active or negative composition of the zinc electrode with its attendant change in current density.

OBJECTS AND SUMMARY OF THE INVENTION

It is therefore an object of the instant invention to provide an improved electric storage battery which overcomes the aforementioned disadvantages.

Another object is to provide an improved electric storage battery suitable for use in an environment wherein extensive charge/discharge recycling is required.

It is another object to provide an improved negative plate for use in a rechargeable electric storage battery of a type which employs a fluid electrolyte.

Another object is to provide a separator system for use in silver-zinc batteries.

It is another object to provide in a storage battery an improved plate having a silver grid coated with a negative active composition and which overcomes the inherent shape-change phenomenon involved in redistribution of the negative composition during cycling.

It is another object of the instant invention to provide in an electrical storage battery a negative plate of a substantially uniformly contoured wedge-shaped configuration, including a grid of a planar configuration embedded in an homogeneous mass of a negative composition selected from a class of composition which includes zinc.

These and other objects and advantages are achieved through the use of a plurality of positive plates of a planar configuration, each including a silver grid embedded in an homogeneous mass of a positive composition selected from a class of composition which includes powdered silver, a plurality of negative plates alternately interposed between the positive plates, each being of a substantially uniformly contoured, wedge-shaped configuration and includes a grid of a planar configuration formed of a metallic silver embedded in an homogeneous mass of a negative composition selected from a class of negative compositions including zinc-oxide, and a separator system interposed between the positive and negative plates including an absorber of a substantially inert highly absorbent material contiguous with the positive and negative plates and a plurality of semi-permeable membranes interposed therebetween.

DESCRIPTION OF THE PREFERRED EMBODIMENT

Figure 1:
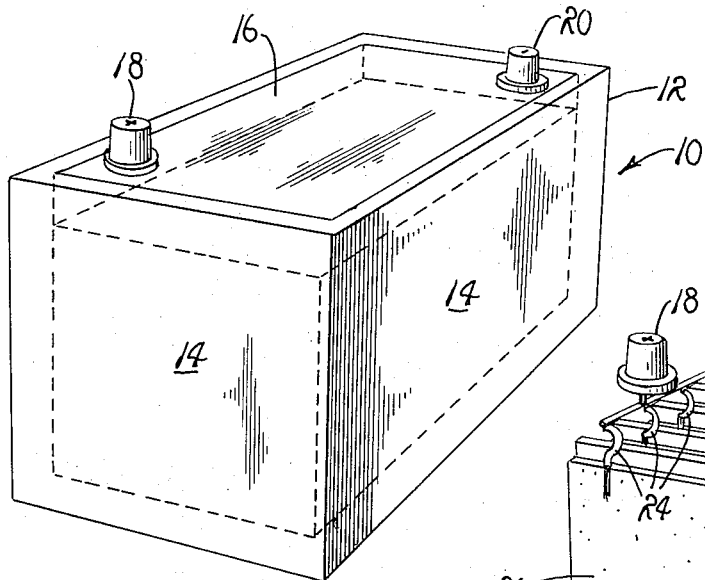
FIG. 1 is a perspective view of a secondary electric storage battery which embodies the principles of the instant invention.

Referring now to the drawings wherein like reference characters designate like or corresponding parts throughout the several views, there is shown, in FIG. 1, a silver-zinc electric storage battery 10 which embodies the principles of the instant invention.

Figure 2:
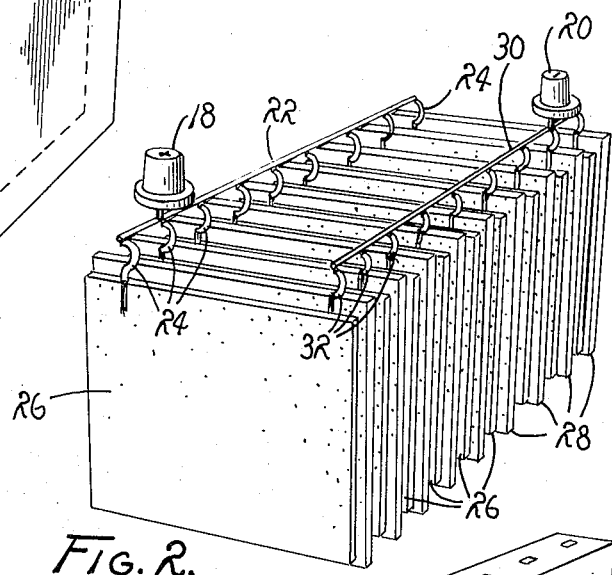
FIG. 2 is a perspective view of a plate-pack without a normally related separator system, employed in the battery depicted in FIG. 1, illustrating one arrangement for the positive and negative plates employed therein.

As shown, the battery 10 includes a battery case 12 having orthogonally related walls 14 and a top closure member 16 arranged in substantial parallelism with a bottom closure member, not shown. From the top closure 16 there protrudes electrodes 18 and 20 which, in practice, extend through the top closure member 16. A bus bar 22, FIG. 2, and electrical leads 24 serve to couple the electrode 18 with a plurality of positive plates 26. In a similar fashion, the negative electrode 20 is coupled with a plurality of negative plates 28 through a bus bar 30 and suitable leads 32. For reasons which should readily be apparent, the particular manner in which the plates 26 and 28, respectively, are coupled to the electrodes 18 and 20 can be varied as desired. For example, the leads 32 may, if desired, be welded to both the plates and the bus bars to thus establish an integrated unit.

It is to be understood that the positive plate 26 forms no specific part of the instant invention. Accordingly, a detailed description of this plate is omitted in the interest of brevity. However, it further is to be understood that the plate 26 is fabricated in a manner consistent with currently employed techniques, including pasting silver or silver-oxide and a suitable binding material to a silver or nickel grid. If preferred, powdered silver or powdered silver-oxide and a binder are molded into sheets and then pressed into the grid. Where silver-oxide is employed, the pasted plates are sintered so that the silver-oxide is converted by thermal decomposition to silver and the organic additives are burned off. Grid thickness, silver density, and plate thickness, of course, are varied to suit intended uses.

Figure 3:
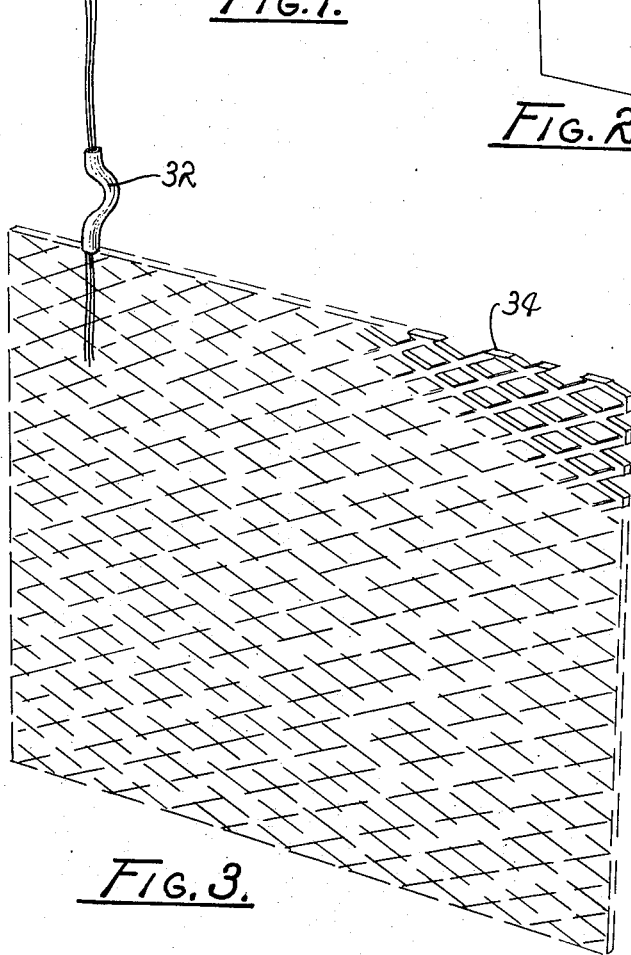
FIG. 3 is a perspective view of a grid employed in fabricating the negative plates shown in FIG. 2.
Figure 4:
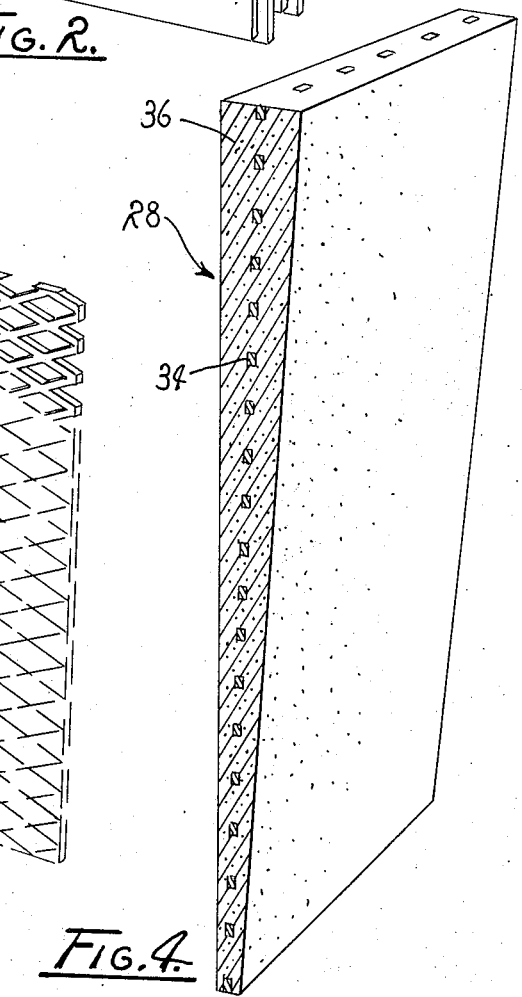
FIG. 4 is a perspective, partially sectioned view of one of the negative plates shown in FIG. 2.

As shown in FIG. 3, each of the negative plates 28 includes a grid 34 onto which a negative active composition 36, FIG. 4, is deposited by any suitable technique, including dry-pressing a mixture of zinc-oxide, binder and adhesive onto the grid placed in a mold conforming to the shape and dimension of the negative plate 28, as by depositing zinc onto a grid and then rolling or pressing the plate to the required contour.

The contour of the negative plate 28 conforms to a uniform, wedge-shaped configuration thicker at the top than at the bottom. Preferably, the plate 28 is twice as thick at the top as at the bottom, however, the specific relationship in dimensions is varied according to imposed parameters. Accordingly, it is to be understood that the negative plate of the instant invention is a porous negative plate of a substantially uniformly contoured, wedge-shaped configuration and includes therein a grid of a substantially planar configuration embedded in an homogeneous mass of a negative composition, selected from a class of compositions which includes zinc-oxides.

Figure 5:
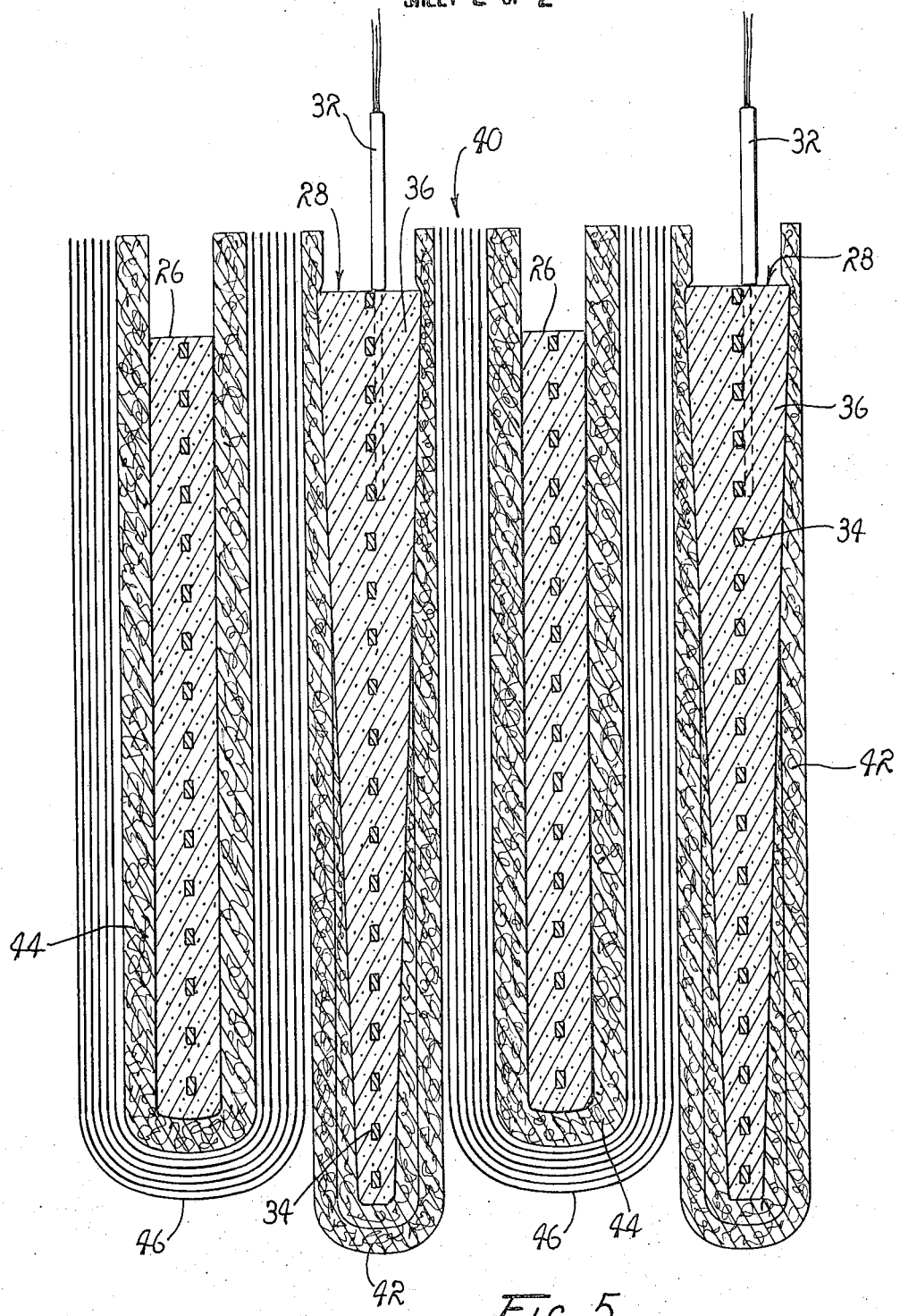
FIG. 5 is an enlarged, fragmented, cross-sectional view of a portion of the plate-pack depicted in FIG. 2, illustrating a suitable separator system as operatively employed in separating the positive and negative plates.

As best illustrated in FIG. 5, the positive plates 26 and the negative plates 28 are separated by a separatory system, generally designated 40.

Broadly, there are three categories of separators, namely cellulosics, non-cellulosic synthetic material and inorganic separators. Separators also serve specialized functions as silver-migration limiters, zinc-penetration limiters and electrolyte absorbers. As employed in the instant invention, the separator system 40 includes a negative absorber 42 wrapped about each of the wedge-shaped negative plates 28 and a positive absorber 44 wrapped about the positive plates 26.

In practice, the negative absorber includes multiple layers of a regenerated cellulose of a type sometimes referred to as fibrous sausage casing. The negative absorber 42 serves to hold a quantity of electrolyte in contact with the negative plate while inhibiting zinc-dendrite growth by reducing zinc penetration.

The positive absorber 44 of the separator system 40 preferably is formed of an irradiated polypropylene. Accordingly, it can be seen that the positive absorber 44 is a relatively inert material which is placed next to the positive electrode to assist in inhibiting silver-migration and to absorb electrolyte.

Between the negative and positive absorbers 42 and 44, respectively, there is interposed a plurality of semi-permeable membranes 46 also formed of fibrous sausage casing, or irradiated polyethylene grafted with methacrylic acid. It is, of course, important to understand that the membranes 46 function to separate the absorbers 42 and 44 while accommodating a passage of electrolyte and ions therethrough during cycling. While various electrolytes can be employed, potassium hydroxide functions quite satisfactorily for this purpose.

It is to be understood that through a use of the wedge-shaped negative plates and the separator system, which includes both positive and negative absorbers separated by multiple layers of semi-permeable membranes there is provided an improved electric storage battery which combines the characteristics of a silver electrode with those of a zinc-electrode and which is electro-chemically reversible.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An improved rechargeable battery for storing electrical energy including:

A. a plurality of positive plates of a planar configuration, each comprising a silver grid embedded in an homogeneous mass of a positive composition selected from a class of compositions which includes powdered silver;

B. a plurality of negative plates alternately interposed between said positive plates, each of the negative plates being of a substantially uniformly contoured, wedge-shaped configuration and comprising a grid of a planar configuration formed of metallic silver and embedded in an homogeneous mass of a negative composition selected from a class of negative compositions which includes zinc-oxide;

C. a separator system interposed between said positive and negative plates including an absorber of a substantially inert, highly absorbent material contiguous with the surfaces of the positive and negative plates and a semi-permeable membrane interposed therebetween; and D. a battery case including means defining a bottom and a top closure member and opposed sides disposed in normal relation to said plates.

2. The improvement of claim 1 wherein the absorber is irradiated polypropylene.

3. The improvement of claim 1 wherein the absorber is a highly absorbent cellulosic material.

4. The improvement of claim 1 wherein the membrane is regenerated cellulose sheeting.

5. The improvement of claim 1 wherein the membrane is irradiated polyethylene.

* * * * *